US008043455B2

(12) United States Patent
Reichert

(10) Patent No.: US 8,043,455 B2

(45) **Date of Patent: *Oct. 25, 2011**

(54) METHOD FOR FORMING AN INSULATING GLAZING UNIT

(75) Inventor: Gerhard Reichert, New Philadelphia, OH (US)

(73) Assignee: Edgetech I.G., Inc., Cambridge, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/022,591

(22) Filed: Jan. 30, 2008

(65) Prior Publication Data

US 2008/0115877 A1 May 22, 2008

Related U.S. Application Data

(63) Continuation of application No. 11/051,525, filed on Feb. 4, 2005, now Pat. No. 7,347,909.

(60) Provisional application No. 60/541,552, filed on Feb. 4, 2004.

(51) Int. Cl.
*C03C 27/00* (2006.01)

(52) U.S. Cl. .......... 156/107; 156/99; 156/102; 156/106; 156/109; 52/786.1; 52/786.13; 428/34

(58) Field of Classification Search .................... 156/99, 156/107–109, 538–539, 543–544, 552, 556, 156/559, 574–575, 587, 578; 52/786.13, 52/786.1; 428/34
See application file for complete search history.

(56) References Cited

U.S. PATENT DOCUMENTS

| | | | | |
|---|---|---|---|---|
| 3,399,294 A | | 8/1968 | Thieben | |
| 3,759,771 A | | 9/1973 | Battersby | |
| 4,356,614 A | | 11/1982 | Kauferle | |
| 4,431,691 A | | 2/1984 | Greenlee | |
| 4,462,237 A | | 7/1984 | Kauferle | |
| 4,769,105 A | * | 9/1988 | Lisec | 156/468 |
| 4,831,799 A | * | 5/1989 | Glover et al. | 52/172 |
| 4,950,344 A | | 8/1990 | Glover et al. | |
| 5,007,217 A | * | 4/1991 | Glover et al. | 52/172 |
| 5,105,591 A | | 4/1992 | Leopold | |
| 5,260,112 A | | 11/1993 | Grether et al. | |
| 5,332,080 A | | 7/1994 | Lenhardt | |
| 5,888,341 A | | 3/1999 | Lafond | |
| 5,932,062 A | * | 8/1999 | Manser | 156/357 |
| 6,116,315 A | * | 9/2000 | Field et al. | 156/523 |

(Continued)

FOREIGN PATENT DOCUMENTS

DE 2214175 3/1972

(Continued)

OTHER PUBLICATIONS

Japanese Patent Office, Office Action, May 30, 2011, in related JP patent appication 2006552313.*

(Continued)

*Primary Examiner* — Khanh Nguyen
*Assistant Examiner* — Margaret Squalls
(74) *Attorney, Agent, or Firm* — Zollinger & Burleson Ltd.

(57) ABSTRACT

A method of applying a spacer to a glass sheet while forming an insulating glazing unit includes the step of integrating the application of the sealant to the spacer body with the automated manufacturing process. The sealant is applied to the spacer body on line so that the sealant-laden spacer body may be applied to the glass without manually handling the sealant.

10 Claims, 6 Drawing Sheets

U.S. PATENT DOCUMENTS

| | | | | |
|---|---|---|---|---|
| 6,148,890 | A | 11/2000 | Lafond | |
| 6,339,909 | B1 | 1/2002 | Brunnhofer | |
| 6,378,586 | B1 * | 4/2002 | Lafond | 156/362 |
| 6,457,294 | B1 * | 10/2002 | Virnelson et al. | 52/786.13 |
| 6,536,182 | B2 * | 3/2003 | France | 52/786.1 |
| 7,008,492 | B2 | 3/2006 | Lisec | |
| 7,141,282 | B2 | 11/2006 | Demars et al. | |
| 7,347,909 | B2 * | 3/2008 | Reichert | 156/109 |
| 7,357,169 | B2 | 4/2008 | Vianello | |
| 2002/0069823 | A1 | 6/2002 | Briese et al. | |
| 2003/0029134 | A1 | 2/2003 | Deane | |
| 2003/0148049 | A1 * | 8/2003 | Bayer | 428/34 |
| 2003/0178127 | A1 | 9/2003 | Lisec | |
| 2004/0000367 | A1 | 1/2004 | McGlinchy | |
| 2005/0247392 | A1 | 11/2005 | Lisec | |
| 2006/0037262 | A1 | 2/2006 | Siebert | |
| 2006/0201606 | A1 | 9/2006 | Lisec | |

FOREIGN PATENT DOCUMENTS

| | | |
|---|---|---|
| DE | 8004362 U1 | 5/1980 |
| EP | 0709539 | 5/1996 |
| GB | 2045229 | 10/1980 |

OTHER PUBLICATIONS

Warm Edge Digest, Published by Edgetech I.G., Inc., vol. 3, No. 1, Winter 2000.

Edgetech Newsletter, Fall 1990, see p. 3 article titled Super Spacer PIB.

Korean Office Action dated Jun. 29, 2011 in application 2006-7015756 related to U.S. Appl. No. 12/022,591.

* cited by examiner

METHOD FOR FORMING AN INSULATING GLAZING UNIT

CROSS REFERENCE TO RELATED APPLICATIONS

This application is a continuation application of U.S. patent application Ser. No. 11/051,525 filed Feb. 4, 2005 now U.S. Pat. No. 7,347,909; which claims the benefit of U.S. Provisional Patent Application Ser. No. 60/541,552 filed Feb. 4, 2004; the disclosures of both incorporated herein by reference.

BACKGROUND OF THE INVENTION

1. Technical Field

The present invention generally relates to insulating glazing units and, more particularly, to a method for applying a sealant to a spacer body and forming an insulating glazing unit with the sealant-laden spacer body. Specifically, the present invention relates to a method for applying a sealant to a spacer body and then forming a glazing unit without disturbing the sealant disposed on the spacer body to minimize sealant failures.

2. Background Information

Insulating glazing units generally include first and second glass sheets that are spaced apart and held by a perimeter spacer. A wide variety of spacer configurations are known in the art. A common feature to the spacers is that they physically separate the first and second glass sheets while providing a hermetic seal at the perimeter of the glass sheets so that an insulating chamber is defined between the glass sheets and inwardly of the spacer. The hermetic seal is formed by a primary sealant that is disposed across at least the interfaces between the spacer body and the glass. The hermetic seal may be formed entirely by the primary sealant or by the combination of the primary sealant and an element (such as a metal foil) of the spacer body.

The primary sealant that hermetically seals an insulating glazing unit is applied to spacer bodies in different locations, manners, and times in prior art insulating glazing unit fabrication systems. In one fabrication system, the primary sealant is applied into a channel formed between a pair of glass sheets and outwardly of the spacer. This type of system is shown, for example, in U.S. Pat. No. 3,759,771. A drawback with this type of system is that the application of the primary sealant is designed for both the spacer and the glass. The application method is thus not optimized for either component individually. In another fabrication system, the primary sealant is applied to a spacer body before the spacer body is placed into a storage and shipping container that is used to delivery the spacer body to the location wherein the insulating glazing unit is manufactured. This type of spacer system is shown, for example, in U.S. Pat. No. 4,431,691. In these types of systems, the sealant-laden spacer bodies are removed from the storage containers and then applied to one sheet of glass to form a perimeter frame. The sealant-laden spacers may also be removed from their storage containers, formed into a frame, and then applied to the glass. The second sheet of glass is applied to form an outer channel. The components are then passed through a heated roller press to wet out the primary sealant against the glass to form the primary seal. In these embodiments, the primary sealant applied to the spacer body can be damaged during storage, shipping, and handling before it is applied to the glass. Damaged sealant can create a leak that requires the window manufacturer to replace the window under its warranty policy. Another drawback with these systems is that the temperature of the sealant is difficult to control when the sealant initially engages the glass. One solution to these problems is to apply heat and pressure (such as by passing the unit through a heated roller press) to ensure good adhesion between the sealant and glass. These prior art methods have drawbacks and the art desires a solution that overcomes these drawbacks.

BRIEF SUMMARY OF THE INVENTION

One characteristic of the invention is the integration of the sealant application step with the manufacturing process of an insulating glazing unit. The sealant is applied to the spacer body at the manufacturing facility where the insulating glazing unit is formed after the spacer body has been removed from its storage container. Another characteristic is that the sealant is not manually handled after the sealant is applied to the spacer body. Another characteristic is that the sealant is applied to the spacer body before the sealant engages the glass providing the opportunity to optimize the application of the sealant to the spacer and the optimization of the connection of the sealant-laden spacer to the glass. Another characteristic of the invention is the ability to control the temperature of the sealant while the sealant is applied to the spacer body and to the glass. These characteristics may be used individually and in combination.

In one embodiment, the invention provides a method of applying a spacer to a glass sheet while forming an insulating glazing unit; the method including the steps of: (A) providing a spacer body in a storage container; (B) removing the spacer body from the storage container; (C) applying a sealant to the spacer body to form a sealant-laden spacer body after step (B); (D) connecting the sealant-laden spacer body to a first sheet of glass; and (E) forming a spacer frame from the sealant-laden spacer body after step (C); wherein the method is free of the step of manually handling the sealant-laden spacer body after step (C).

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
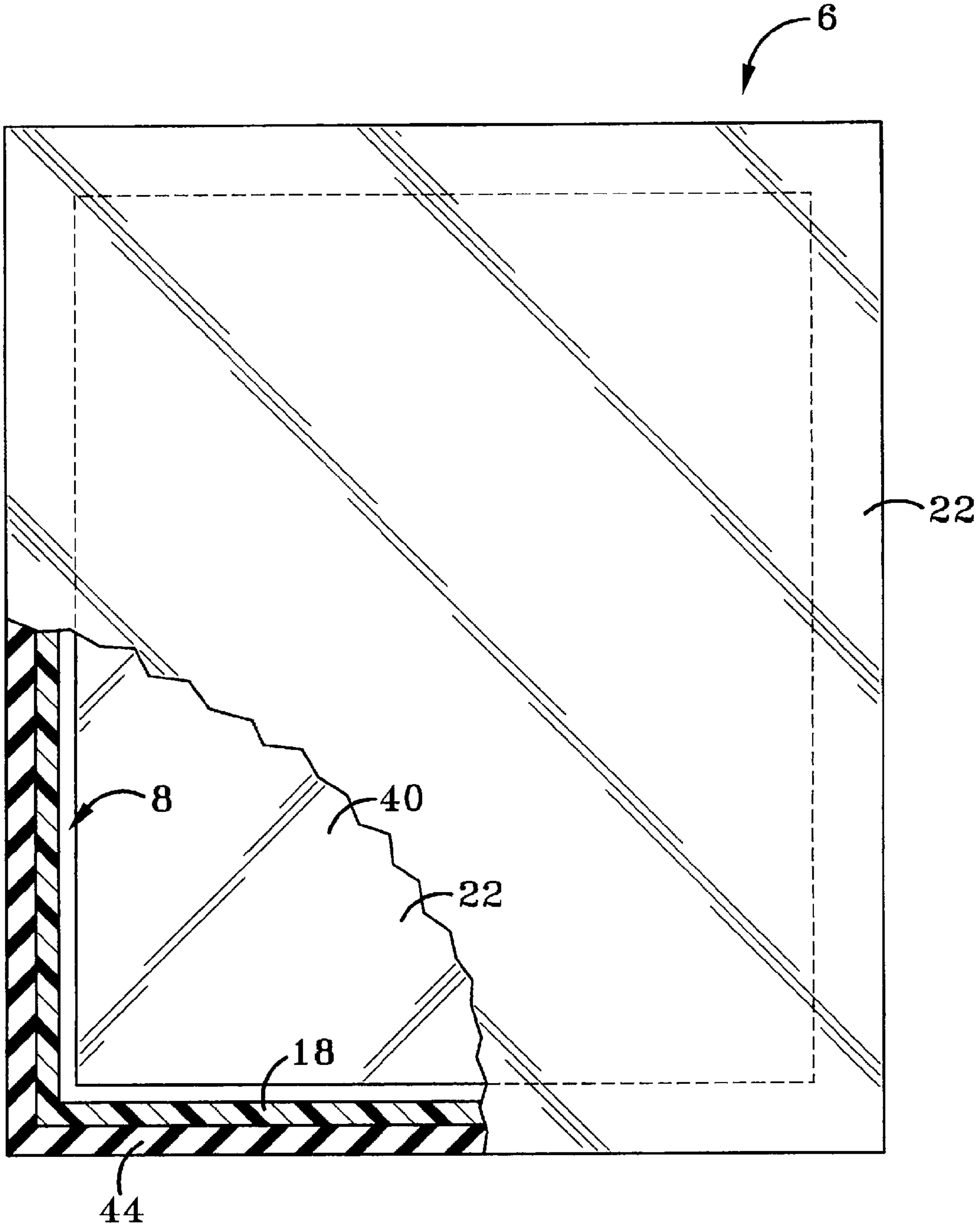
FIG. 1 is front view, partially broken, of an exemplary insulating glazing unit made with the method and spacer of the present invention.
Figure 9:
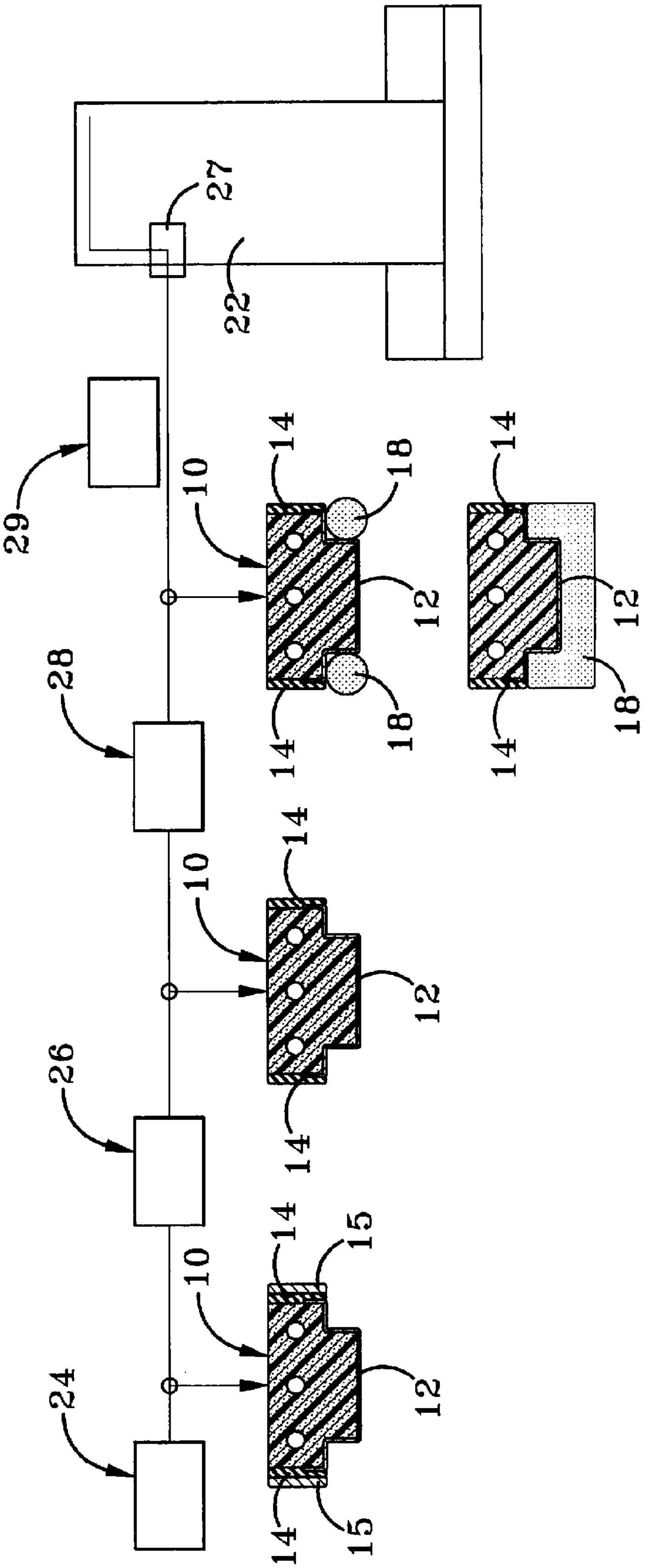
FIG. 9 is a schematic view of the method and apparatus of the invention.

An exemplary insulating glazing unit made in accordance with the method of the present invention is indicated generally by the numeral 6 in FIGS. 1 and 9. Insulating glazing unit 6 generally includes a spacer assembly 8 that supports a pair of glass sheets 22 in a spaced configuration to define an insulating chamber 40 between glass sheets 22 and inwardly of spacer assembly 8. Spacer assembly 8 includes at least a spacer body 10 and a primary sealant 18. In the context of this application, the primary sealant is the sealant that forms the seal between the structural element of the spacer and the glass. Spacer assembly 8 may optionally include a second sealant 44. Spacer body 10 may include any of a variety of elements used in combination and may be fabricated from a wide variety of materials. For example, spacer body 10 may include a vapor barrier and adhesive used to secure spacer body 10 to glass sheets 22. In the exemplary embodiment of the invention, spacer body 10 is formed from a flexible foam material. Spacer body 10 may optionally carry a desiccant.

In an exemplary embodiment, spacer body 10 is provided to the insulating glass manufacturer in a storage container 24. Storage container 24 may be hermetically sealed to preserve desiccant when flexible spacer body 10 carries desiccant. For instance, spacer body 10 may be a flexible spacer body such as the spacer body sold under the federally registered SUPER SPACER trademark by Edgetech IG of Cambridge, Ohio. Exemplary spacer bodies 10 are disclosed in U.S. Pat. No. 4,831,799, the disclosures of which are incorporated herein by reference. When a flexible spacer body is used, the flexible spacer body may be coiled on a reel within container 24. In the exemplary embodiment, spacer body 10 has a metal foil vapor barrier 12 disposed between a pair of shoulders that support adhesive 14. Adhesive 14 is used to secure spacer body 10 to glass sheets 22. Adhesive 14 may be a pressure sensitive adhesive. One exemplary adhesive is a UV resistant pressure sensitive acrylic adhesive. The exemplary spacer body 10 defines notches 16 below the shoulders. Spacer body 10 may define longitudinal openings disposed directly between the shoulders that define insulating air pockets. The openings also break the direct thermal path between the shoulders.

A schematic drawing of the integrated on-line sealant application method of the invention is presented in FIG. 9. In order to form insulating glazing unit 6 with integrated sealant application, spacer body 10 is removed from storage container 24 and placed into the apparatus that applies the spacer to the glass while forming the insulating glazing unit 6. A stripper 26 removes the protective covers 15 from the adhesive layers 14. Spacer body 10 then interacts with an apparatus 28 that applies sealant 18 to spacer body 10. Appropriate mechanisms may be provided to move spacer body 10 through a sealant applicator 28 so that sealant 18 may be applied. For example, these mechanisms may include appropriate guides and rollers. An advantage with this method is that apparatus 28 may be configured to optimize the application of sealant 18 to spacer body 10 such that air pockets are avoided and sealant 18 is applied in the proper amount and in the proper location. Applicator 28 may include a pair of oppositely disposed applicator nozzles 20. Sealant 18 may be applied to both oppositely disposed notches 16 simultaneously with different nozzles 20. Nozzles 20 may be angled as shown in the drawing or may be straight so that they face each other. In another embodiment, sealant 18 may be applied to one corner notch 16 with a first nozzle at a first location and to the other corner notch 16 with a second nozzle at a second location downstream of the first location. Applicator 28 may be disposed with and move with the applicator 27 that applies spacer body 10 to glass 22. When disposed in this location, there is almost no chance of sealant contamination after the sealant is applied to the spacer body. The sealant also has little time to cool before engaging the glass.

Figure 3:
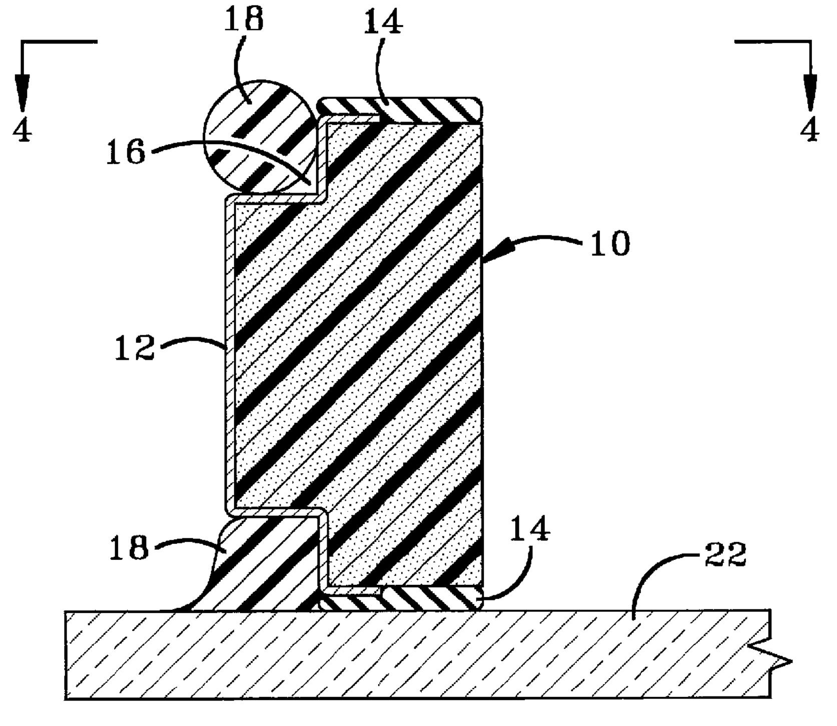
FIG. 3 is a section view of the sealant-laden spacer body being applied to the first sheet of glass.
Figure 4:
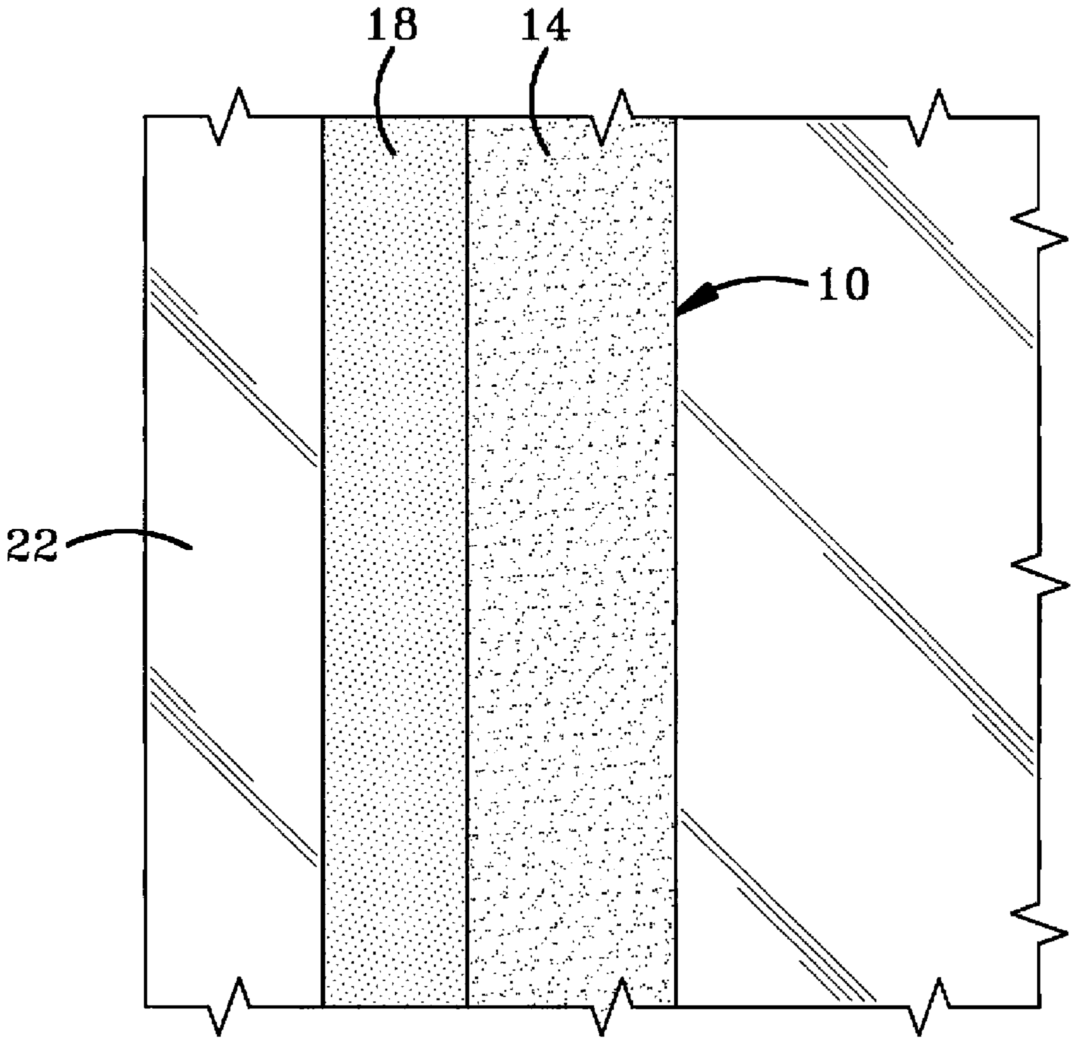
FIG. 4 is a top plan view taken along line 4-4 of FIG. 3.

Spacer body 10 is then applied to glass 22 as shown in FIG. 3 without any off-line storage steps or manual handling steps. The freshly applied sealant 18 is immediately joined with the glass with little chance for undesirable contamination. The application of sealant 18 is thus integrated into the manufacturing process in a manner that has not been previously recognized in the art. In one embodiment of the invention, the frame is formed while the sealant-laden spacer body is applied to glass 22. Spacer body 10 and sealant 18 may be created into a frame through the use of automated equipment that follows the perimeter of glass 22. Spacer body 10 and sealant 18 may also be created into a perimeter frame with a hand-operated applicator. Such hand-operated applicators allow the user to manually apply the spacer body to the glass without manually handling the sealant-laden spacer body.

Figure 7:
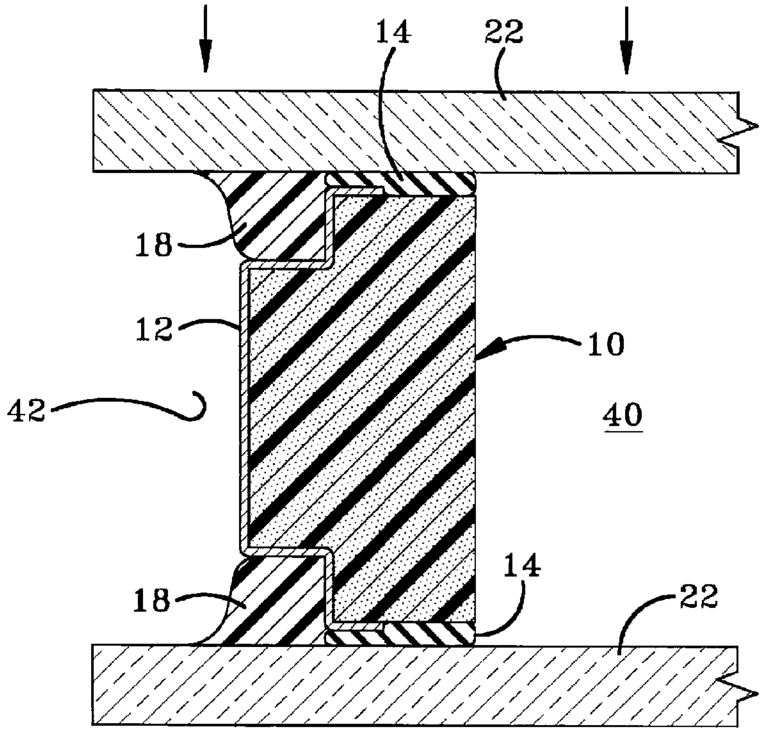
FIG. 7 is a section view similar to FIG. 3 showing a second sheet of glass applied to the spacer.
Figure 8:
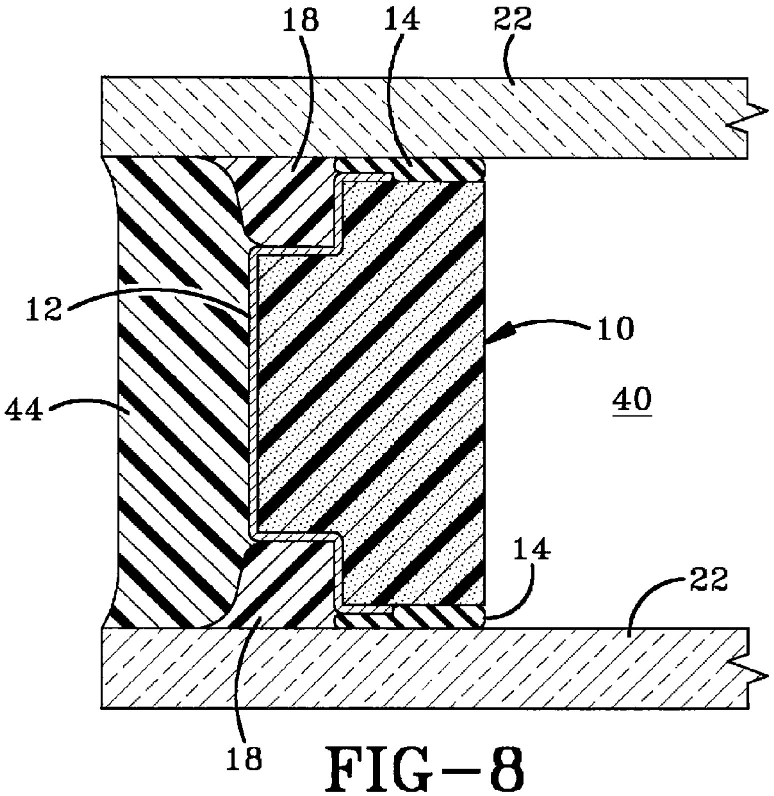
FIG. 8 is a section view of the spacer of FIG. 7 with the outwardly-disposed channel filled with a sealant.

A second sheet of glass 22 is applied (FIG. 7) to create insulating glazing unit 8 with an insulating chamber 40 defined between the two glass sheets 22 and spacer body 10. An outwardly-facing sealant channel 42 also may be defined by locating spacer body 10 inwardly from the edge of glass sheets 22. In some embodiments, a second sealant 44 is then placed in channel 42 in any of a variety of methods known in the art. Sealant 44 may be the same sealant as sealant 18 or may be a substantially different sealant depending on the desired characteristics of the insulating glazing unit.

Sealant 18 may be any of a wide variety of sealants known to those skilled in the art for creating a hermetic seal between the spacer body and the glass sheets 22 in an insulating glazing unit. For the purposes of providing a non-limiting example, sealant 18 may be a polyisobutylene, a hot melt butyl, a hot melt material, a UV curable material, or a material that cures to have structural strength so as to resist sheer forces. Some of these materials remain flowable after applied and cooled while other materials become non-flowable after they cure. Another type of sealant 18 that may be applied in this method is a sealant that cross links to the glass to create the adhesion between the sealant and the glass.

Figure 2:
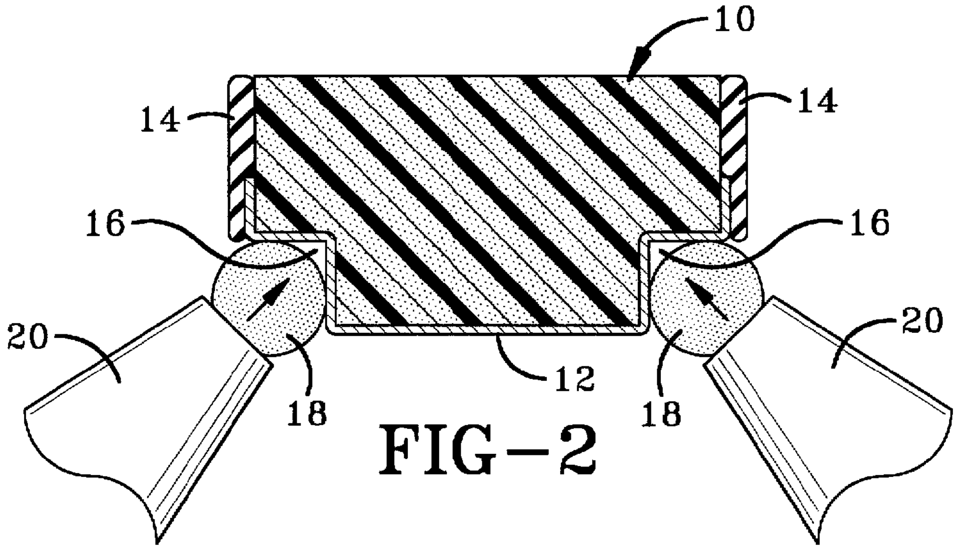
FIG. 2 is a section view of an exemplary spacer body with two nozzles applying a sealant to two sides of the spacer body after the spacer body has been removed from its storage location.

One advantage of this invention is that the application of the sealant is independent from the glass application step so that glass 22 does not interfere with the application of sealant 18 to spacer body 10. This method thus allows both steps to be independently optimized. Another advantage is that the temperature of sealant 18 may be controlled for ideal application to spacer body 10 and then changed to a different temperature for ideal application to glass 22. In some embodiments, the user may desire to cool sealant 18 from a higher temperature in FIG. 2 to a lower temperature in FIG. 3 while still retaining some of the heat in sealant 18 when sealant 18 is applied to glass 22. Sealant 18 is typically heated above the ambient temperature when it is applied to spacer body 10. With some sealants 18, it is desired to maintain its elevated temperature until it is applied to the glass. With other sealants, the temperature of sealant 18 may need to be raised from the location of FIG. 2 to the location of FIG. 3. In still other embodiments, the user may desire to maintain a constant temperature from the location of FIG. 2 to the location of FIG. 3. In each of these embodiments, appropriate cooling/heating devices 29 (such as air knives or accumulators or heaters) may be used to regulate the heat retained by sealant 18.

Another advantage with this invention is that the integrated, on-line application of sealant 18 minimizes the opportunity for the contamination of sealant 18. The environment sealant 18 is subjected to between the location of FIG. 2 and the location of FIG. 3 may be closely controlled for ideal sealant conditions. The method thus also avoids the prior art problems created when the spacer body is handled prior to its application to glass 22 because there does not need to be any manual handling between the application of the sealant and the connection of the sealant-laden spacer body with the glass. This method also avoids the problem of the sealant becoming misshapen during storage and shipping. Sealants can become misshapen during storage and shipping when the sealants flow (if they are flowable materials and especially if they are shipped in hot containers). Sealants have also become misshapen during shipping when subjected to the weight of other adjacent packages of spacer bodies.

Figure 5:
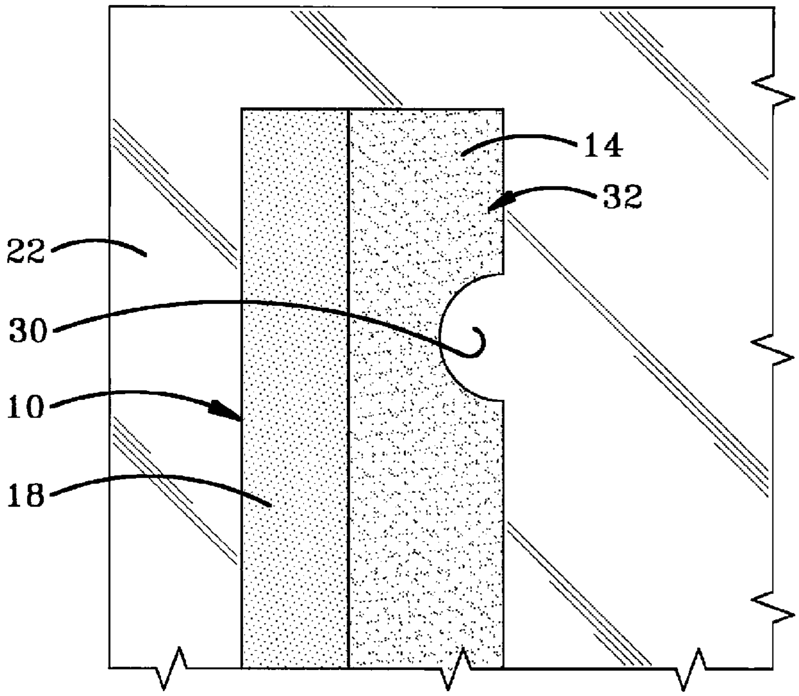
FIG. 5 is a top plan view similar to FIG. 4 taken at a corner location showing an exemplary corner notch used to form a corner.
Figure 6:
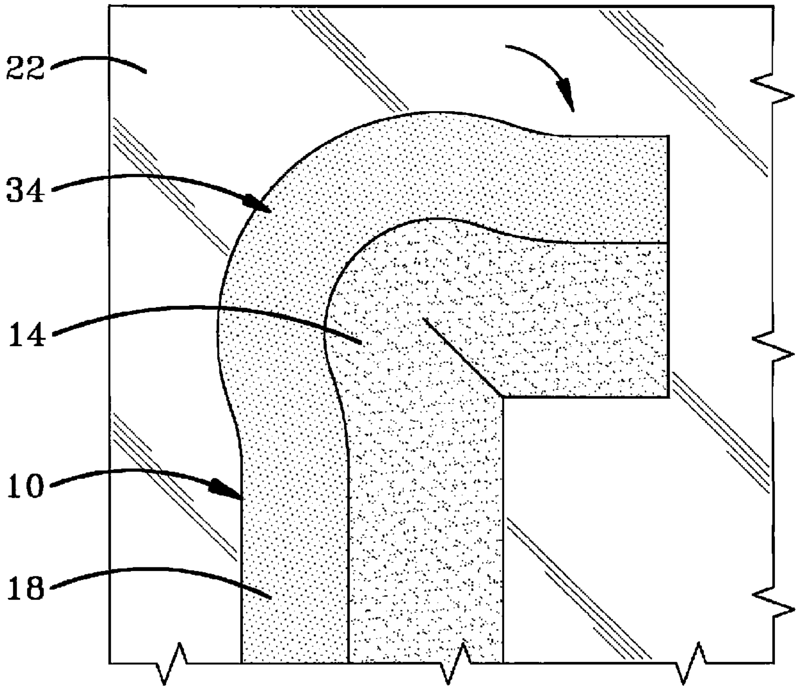
FIG. 6 is a top plan view of the notched spacer of FIG. 5 with the sealant-laden spacer body bent into a 90° corner.

In an independent embodiment, the present invention provides a new method for forming corners when spacer body 10 is applied to glass 22. The corner forming method of FIGS. 5 and 6 is independent of the sealant applicant method described above but may be used in combination with the method. The new corner-forming method is shown (exaggerated) in FIGS. 5 and 6. FIG. 5 shows a corner location for the spacer frame. The applicator notches spacer body 10 to create a partial notch 30 in spacer body 10 when the applicator reaches a corner location. Notch 30 extends only through the thick inner body portion 32 between the shoulders of spacer body 10. Notch 30 may be circular, triangular, rectangular, or any of a variety of other shapes. By passing notch 30 only partially through the shoulder area of body 10, notch 30 does not interfere with sealant 18 and creates a bulged area 34 when spacer body 10 is folded 90 degrees as shown in FIG. 6. Notch 30 may extend entirely through the shoulder area to allow body 10 to easily bend around the corner. The bulge of sealant 18 helps create a strong seal at the corner of the spacer frame. The corners are traditionally the most difficult areas to seal and the partial notch ensures an enlarged amount of spacer body 10 at the corner and an enlarged amount of sealant 18 at the corner.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method for forming an insulating glazing unit comprising the steps of:

(A) providing a flexible spacer body in an automated apparatus adapted to apply the flexible spacer body to a glass sheet; the spacer body having at least two shoulders adapted to engage the inner surfaces of first and second glass sheets of an insulating glazing unit; the spacer body defining a pair of notches;

(B) applying a primary sealant to at least the notches of the spacer body after step (A) to form a sealant-laden spacer body with portions of the primary sealant disposed adjacent to each, of the shoulders adapted to engage the inner surfaces of the glass;

(C) forming a spacer frame from the sealant-laden spacer body as the spacer body is connected to the glass after step (B) by adhesively connecting one of the shoulders of the flexible spacer body to a first sheet of glass with an adhesive disposed between the shoulder and the glass;

(D) adhesively connecting a second sheet of glass to the other shoulder of the sealant-laden spacer body to form an insulating glazing unit;

(E) forming an outwardly-facing sealant channel between the first and second sheets of glass and the spacer body during steps (C) and (D); and (F) inserting a secondary sealant in the outwardly-facing sealant channel to cover the primary sealant.

2. The method of claim 1, wherein the spacer body is coiled in a storage container and further comprising the step of uncoiling at least a portion of the spacer body from the storage container before step (A).

3. The method of claim 1, further comprising the step of providing the spacer body in the form of a flexible, desiccant-carrying, foam-based material.

4. The method of claim 1, wherein the width between the shoulders defines the maximum width of the spacer body and wherein step (D) includes the step of sandwiching the entire spacer body between the first and second glass sheets.

5. The method of claim 1, wherein step (C) includes the step of forming a corner in the sealant-laden spacer body by notching the shoulders and bending the sealant-laden spacer body at the notch to form a corner having a sealant bulge.

6. The method of claim 1, wherein step (B) includes the step of simultaneously applying the sealant to the notches.

7. The method of claim 1, wherein step (B) includes the step of applying the sealant to one of the notches at a first location and to the other notch at a second location downstream of the first location.

8. The method of claim 1, further comprising the step of allowing the sealant to cool after step (B) and before the sealant-laden spacer body is connected to the first glass sheet of the glazing unit.

9. The method of claim 1, further comprising the step of heating the sealant to a temperature above the ambient temperature before step (B) and performing step (C) before the temperature of the sealant returns to ambient temperature.

10. The method of claim 1, further comprising the step of maintaining the shoulders substantially free of primary sealant at the locations of the adhesive connections.

* * * * *